United States Patent Office 3,427,825
Patented Feb. 18, 1969

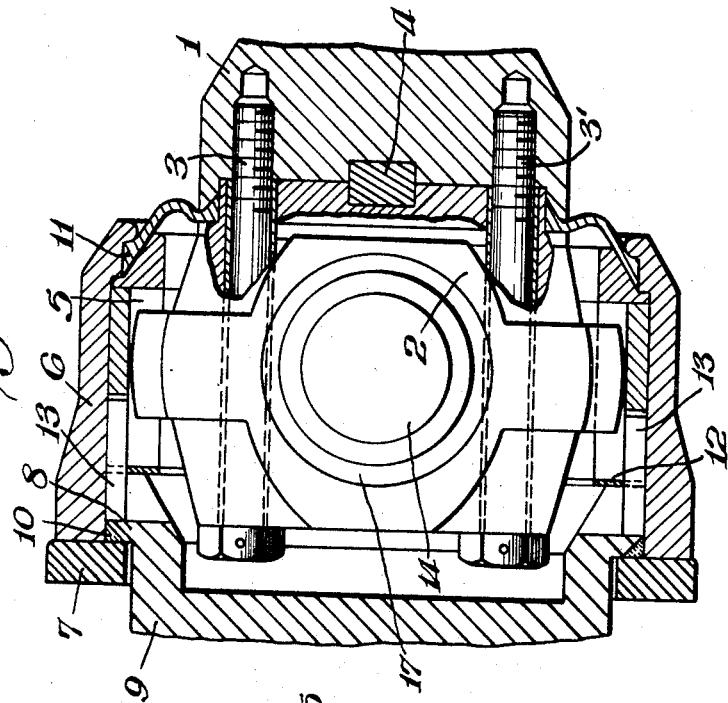
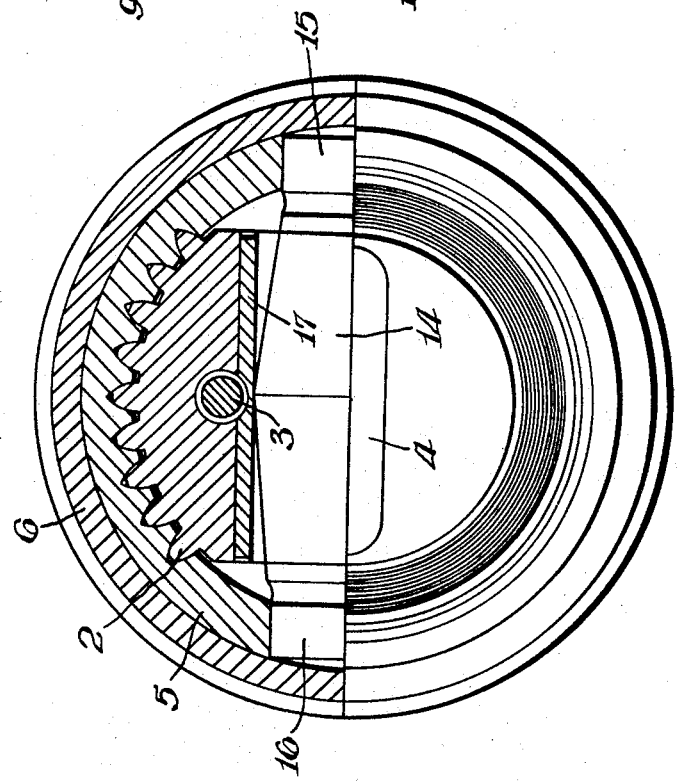

3,427,825
MOTOR COUPLING
Willy John and Herbert Bauerfeind, Selb, Germany, assignors to Gebruder Netzsch, a German company
Filed Nov. 30, 1966, Ser. No. 597,998
Claims priority, application Germany, Mar. 31, 1966, N 28,314
U.S. Cl. 64—7
Int. Cl. F16d 3/76
10 Claims

ABSTRACT OF THE DISCLOSURE

A gear coupling between an operating motor and driving motor wherein the drive shaft is connected to the rotor of a worm gear pump with the transmission of force taking place by a driving part having external teeth engaged with the internal teeth of a ring is characterized by having the driven end of the rotor shaft engaged with the coupling housing in a fluid tight manner to seal the driven end for direct fluid connection with the ring having internal teeth and with this interchangeable ring being of substantially the same outer diameter as the driven end and further with connecting means joining the ring to the driven end.

---

The invention relates to a joint for worm gear pumps whose stator and rotor have differing numbers of threads, the rotor head moving eccentrically and the rotor being connected with the drive shaft by an intermediate joint which equalizes the eccentric movement of the rotor.

Gear couplings for the connection of work machines with driving machines are known per se.

Previously, Cardanic joints have been used for this purpose, wherein the rotor head and the driving shaft engaging with it are connected to each other by a swingable transverse pin or rod. Such couplings, however, have the disadvantage that by the swinging movement of the transverse rod, not only does a greater wear occur, but also the lug at the driving shaft and the transverse rod supports at the rotor head are pushed out after a short time. For replacement, even the driving shaft must be dismantled. This thereby results in an extensive interruption in operation. As a result of the high surface pressures on the transverse rod and its support positions, a renovation of these parts must be undertaken fairly often, which aside from the work interruptions also increases the expense for the replacement parts. A certain progress was brought about by the known flexible metal-rubber joints, but their use at high temperatures of the conveying medium and in connection with certain requirements was limited.

An object of this invention is to provide an improved worm gear pump joint which overcomes these disadvantages.

This object is achieved in accordance with one aspect of this invention by forming the connection between rotor head and driving shaft by an inner and outer-geared coupling inner part, whose inner gearing engages in the similarly geared lugs or teeth of the driving shaft. The outer gearing is Cardanically engaged with a gear wheel provided in the rotor housing. At the same time, the outer side of the geared coupling inner part is constructed spherically and is supported in a shell shaped accordingly, which is pressed by means of spring action to the sides of the gear rim. In this manner the torque transmitted to the gear rim is transmitted to the rotor head to which the springs are otherwise joined, while the axial forces setting in are absorbed by the spherical part.

The problem of connecting a ball joint with geared coupling is known per se. On the other hand, it is inventive and novel that the inner gearing at the outer casing of the coupling is no longer directly applied to such casing but is replaced by a gear rim provided with inner gearing and which can be interchangeably inserted in the outer casing.

In accordance with a further embodiment of the invention, the joint housing is not bolted to the rotor head, but is connected by a covering plate fastened by screws. This avoids the application of the outer winding to the rotor head and of the inner winding in the rotor head housing. Thus a considerable reduction of the finishing time is achieved, since it is precisely the cutting of the windings on the lathes which is so time-consuming. The solution found makes it furthermore possible to achieve a connection of the gear rim with the left cut-shaped shell by a spline connection. Thus the axial surface pressure required for the torque transmission is avoided, which makes possible not only an increased reliability of operation but also a decrease of the structural elements by the abolishment of the springs for the axial pressure, the springs becoming superfluous in this embodiment.

A still further embodiment relates to a design of the inner part of such gear joint and similar couplings wherein axial pressures are absorbed by a ball movably constructed or dome shaped pin, traversing the inner part and supported in the outer gear rim.

In the prior art couplings of this type, axial pressures were absorbed by cup-shaped shells arranged at both sides of the ball-shaped coupling inner part. By means of friction support pressures here taking place, not only more wear was to be registered but also increased power consumption. Furthermore, axial impacts were transmitted to the motor mount, etc. This had a particularly disadvantageous effect in connection with gear pumps, wherein the rotor and stator are provided with differing numbers of threads, since the rotor is joined to the coupling only one-sidedly and therefore in carrying out its tumbler movement brings the cup-shaped shells into position adjoining the coupling inner part by means of axial pressure setting in.

In order to eliminate these drawbacks, a novel solution was found according to this further embodiment of the invention in that the coupling inner part is rigidly connected with the coupling end of the drive shaft by means of bolts and spline and that vertically to the axis direction it has a bushed boring, wherein a ball, movably constructed or dome shaped pin, supported on both sides in the outer gear rim.

This pin absorbs all axial pressures, whereby the inner part is relieved of pressure and no longer must be axially sustained. It thus serves exclusively for the transmission of torque.

Novel features and advantages of the present invention will become more apparent to those skilled in the art by reference to the following description taken in conjunction with the accompanying drawings wherein like characters refer to like parts and in which:

FIG. 5 is a cross-sectional view in elevation of a further embodiment of this invention; and FIG. 6 is a side view partly in section of the embodiment shown in FIG. 5.

Figure 1:
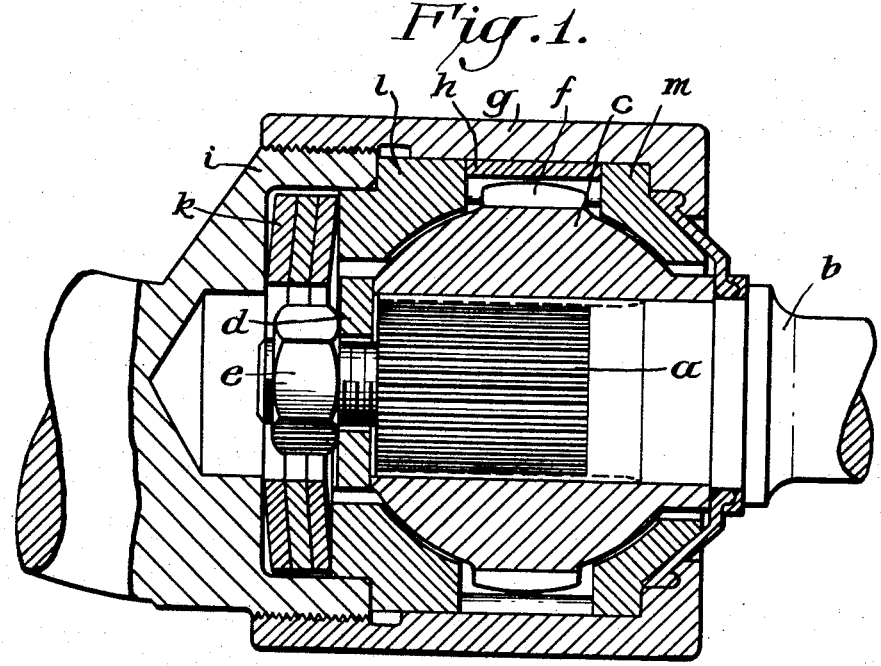
FIG. 1 is a cross-sectional view in elevation of one embodiment of this invention.
Figure 2:
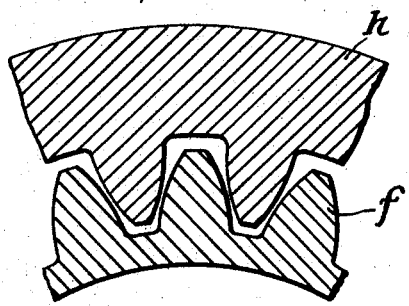
FIG. 2 is an enlarged view of a portion of the gearing shown in FIG. 1.

In the embodiment shown in FIGS. 1–2 a coupling inner part *c* is mounted on geared end *a* of drive shaft *b*. Coupling *c* is provided with internal gear teeth and is spherically shaped at its outer side. Coupling *c* is secured against axial displacement by disk *d* and nut *e*. In the central portion of its outer circumference, coupling part *c* is provided with gear teeth *f* which at the outer diameter and at the sides are preferably somewhat convexly shaped and engage in the gear rim *h* of the rotor head casing *g* with play being between teeth *f* and *h* as shown in FIG. 2. At both sides of the gear rim, the cup-shaped shells *l* and *m* are pressed by pressure of the cup springs *k* situated at the rotor head *i*. By means of contact pressure the radial force transmitted from the coupling inner part *c* to the gear rim is transmitted to the rotor head over shell *l* and cup springs *k*. The resulting axial forces are absorbed by the spherical part of the coupling inner part from shells *l* surrounding it with some play.

Figure 3:
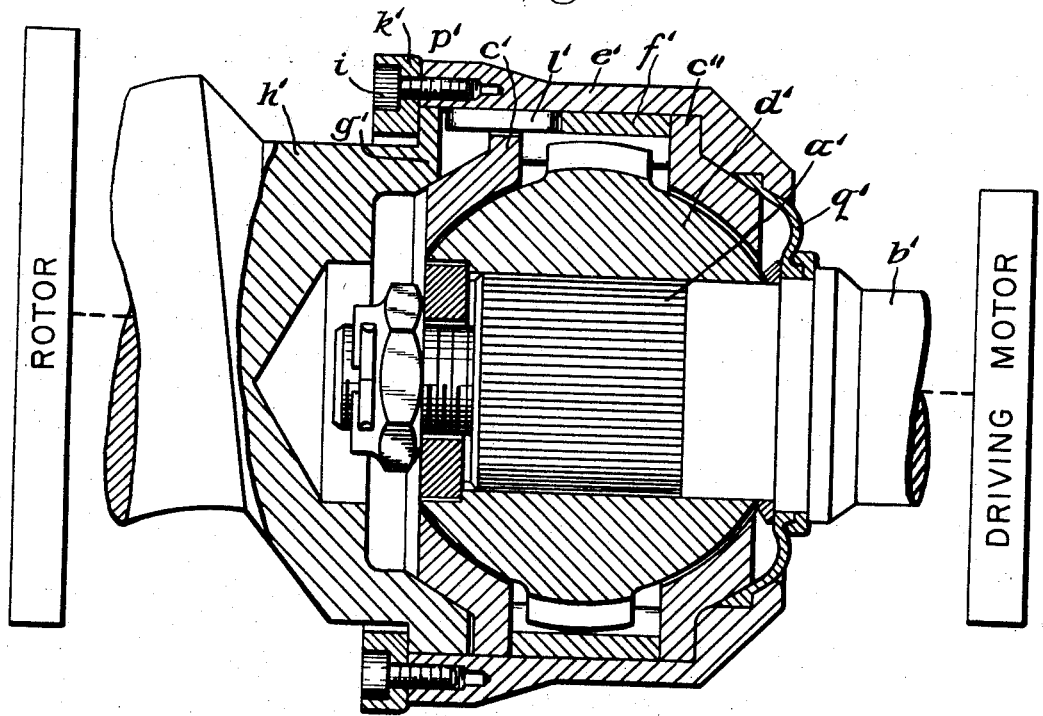
FIG. 3 is a cross-sectional view in elevation of another embodiment of this invention.
Figure 4:
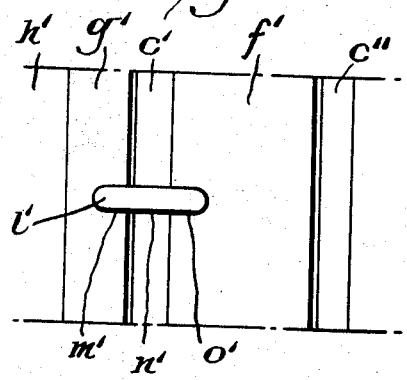
FIG. 4 is a plan view of the spline connection of FIG. 3.

FIGS. 3–4 show another embodiment of this invention. The coupling inner part *d'*, fastened to end *a'* of driving shaft *b'*, has gear teeth at its outer circumference, and is movably arranged in two cup-shaped shells *c'*, *c"*. One shell *c'* is supported at its exterior portion in a casing *e'*, while the other shell *c'* engages in a conical boring at the end of rotor head *h'*.

The shells and the coupling inner part *d'* are arranged in a housing *e'*, wherein between shells *c'*, *c"* there is arranged another gear rim *f'*, provided with inner gearing. The teeth of rim *f'* meshes with the teeth of the coupling inner part *d'*. At the drive-off side, the part of the rotor head *h'* provided with a collar *g'*, engages in the housing case *e'*, which part is fixed in the axis direction by covering plate *k'* attached by means of screws *l'* at the housing. In order to further transmit the torque transmission to the rotor from the driving shaft *b'* by the gearings of the coupling inner part *d'* and of the gear rim *f'*, shell *c'* and rotor head *h'* are geared together. This gearing is connected together preferably by means of one or several splines, keys, or wedges. In the example shown in FIGS. 3–4 the connection by means of a spline *l'* is shown, with the spline engaging in corresponding recesses *m'*, *n'*, *o'*. The interior of housing *e'* and thus all of the force-transmitting coupling parts are tightly sealed on both sides by suitable gaskets *p'*, *q'* greaseproof, whereby even with respect to sensitive conveying media, such as foodstuffs. Thus pollution thereof is prevented.

FIGS. 5–6 show a still further embodiment of this invention. Coupling inner part 2, geared at its outer circumference, is attached by means of bolts 3, 3, at drive shaft 1 shown in FIG. 5, and secured from turning by means of spline 4. With its teeth, coupling inner part 2 meshes with an internally geared outer gear rim 5 which is situated in a housing 6. Housing 6, in turn, is attached by means of a covering plate 7 to the collar 8 of rotor 9. Outer gear rim 5 is thus secured against axial displacement and at the same time is sealed outwards by gaskets 10, 11. By means of one or several insertion splines 13, 13, which in part gear with collar 8 and in part with outer rim 5, the rim 5 is rigidly connected with rotor head 9. These insertion splines 13 and 13 are held by a disk 12 so that they do not fall inside. The outer gear rim transmits directly to the rotor the torque transmitted by it from the coupling inner part.

The coupling inner part 2 is also provided with a boring, wherein ball movably constructed or dome shaped pin 14 is arranged. The pin 14 is supported at both its ends 15, 16 in the outer gear rim 5. As illustrated in FIG. 6 pin 14 is arched in all directions at the center of the coupling. This provides for a solid connection between coupling inner part and outer gear rim which intercepts the axial pressures and as a result of its spherical movement permits undisturbed transmission of the succeeding torque by means of the meshing between both parts.

The boring for pin 14 in the coupling inner part 2 is provided with replaceable abrasion resistant sleeve 17. It is also within the scope of the invention to construct the pin 14 and the abrasion sleeve somewhat deviating from the embodiment shown in the drawing. Thus, the boring of the abrasion sleeve can be constructed spherically and the pin cylindrically. Furthermore, the abrasion sleeve can consist of three parts, the middle section of the ball shape of the pin being fitted and hardened. Then only this piece need be replaced in a stronger abrasion.

Obviously many modifications and variations of the above invention are possible in light of the above teachings. It is, therefore to be understood that within the scope of the appended claims, the invention may be practiced otherwise than as specifically described.

What is claimed is:

1. In a gear coupling between an operating motor and driving motor, wherein the coupling connects a drive shaft to the rotor of a worm gear pump, with the transmission of force taking place by means of an externally toothed driving part locked with the driving shaft engaging an internally toothed ring inserted in a coupling housing, characterized in that the driven end of the shaft being connected to the rotor engages said coupling housing in a fluid tight manner to seal the driven end for form locking with said internally toothed ring, said ring being interchangeable and being of substantially the same outer diameter as said driven end, and connecting means joining said ring to said driven end, a pin being axially inserted through said part, and the ends of said pin being mounted in said ring to permit torque transmission with the elimination of adverse effects by means of axial pressures.

2. A coupling as set forth in claim 1 wherein an abrasion sleeve is disposed between said pin and said part, with said pin being relatively movable within said sleeve.

3. A coupling as set forth in claim 2 wherein said sleeve is multi-sectional, and said pin being dome shaped.

4. A coupling as set forth in claim 1 wherein said inner part is rigidly secured to said drive shaft, spline means preventing rotation of said inner part, and said pin being dome shaped.

5. In a gear coupling between an operating motor and driving motor, wherein the coupling connects a drive shaft to the rotor of a worm gear pump, with the transmission of force taking place by means of an externally toothed driving part locked with the driving shaft engaging an internally toothed ring inserted in a coupling housing, characterized in that the engaging surfaces of said internally toothed ring and of said externally toothed part being of non-resilient hardened material, the driven end of the shaft being connected to the rotor engages said coupling housing in a fluid tight manner to seal the driven end for form locking with said internally toothed ring, said ring being interchangeable and being of substantially the same outer diameter as said driven end, and connecting means joining said ring to said driven end.

6. A coupling as set forth in claim 5 wherein the gear teeth of said ring and of said part have convexly shaped teeth surfaces and outer diameter.

7. A coupling as set forth in claim 5 wherein said externally toothed part is a shaft hub having a ball shaped surface, and spherical segments being disposed on both sides of said shaft hub for absorbing axial forces affecting said shaft hub.

8. A coupling as set forth in claim 7 wherein said spherical segments are clamped between said driving shaft and said housing.

9. A coupling as set forth in claim 5 wherein said connecting means are splines.

10. In a gear coupling between an operating motor and driving motor, wherein the coupling connects a drive shaft to the rotor of a worm gear pump, with the transmission of force taking place by means of an externally toothed driving part locked with the driving shaft engaging an internally toothed ring inserted in a coupling housing, characterized in that the driven end of the shaft being connected to the rotor engages said coupling housing in a fluid tight manner to seal the driven end for form locking with said internally toothed ring, said ring being interchangeable and being of substantially the same outer diameter as said driven end, and connecting means joining said ring to said driven end, said externally toothed part being screwed to said driving shaft, a boring being in said part substantially normal to the axis of said driving shaft, a dome-shaped pin in said boring for absorbing the axial forces, and the ends of said pin engaging said ring.

References Cited

UNITED STATES PATENTS

| | | | |
|---|---|---|---|
| 2,901,898 | 1/1959 | Huey | 64—7 X |
| 2,467,902 | 4/1949 | McPhee | 64—9 |
| 2,543,918 | 3/1951 | Lower | 64—9 |
| 3,142,972 | 8/1964 | Spaulding | 64—7 |
| 3,199,311 | 8/1965 | Hill | 64—7 |

HALL C. COE, *Primary Examiner.*

U.S. Cl. X.R.

64—9